United States Patent [19]

Larinoff

[11] 4,296,802
[45] Oct. 27, 1981

[54] STEAM CONDENSING APPARATUS

[75] Inventor: Michael W. Larinoff, Houston, Tex.

[73] Assignee: Hudson Products Corporation, Houston, Tex.

[21] Appl. No.: 690,883

[22] Filed: May 28, 1976

Related U.S. Application Data

[63] Continuation-in-part of Ser. No. 585,951, Jun. 16, 1975, abandoned.

[51] Int. Cl.³ .............................................. F28B 9/06
[52] U.S. Cl. .................................... 165/110; 60/688; 60/689; 60/692; 60/693; 165/137; 165/DIG. 1; 261/DIG. 11
[58] Field of Search ................. 165/DIG. 1, 110, 111, 165/137; 60/688–693; 62/171; 261/DIG. 11

[56] References Cited

U.S. PATENT DOCUMENTS

| | | | |
|---|---|---|---|
| 2,545,926 | 3/1951 | Lau Bach | 62/171 |
| 2,858,677 | 11/1958 | Stone | 62/171 |
| 3,635,042 | 1/1972 | Spangemacher | 165/110 |
| 3,660,980 | 5/1972 | Knirsch et al. | 165/DIG. 1 |
| 3,782,451 | 1/1974 | Cates | 261/DIG. 11 |
| 3,794,304 | 2/1974 | Cates et al. | 261/DIG. 11 |
| 3,831,667 | 8/1974 | Kilgore et al. | 165/DIG. 1 |
| 3,846,519 | 11/1974 | Spangemacher | 165/110 |
| 3,878,273 | 4/1975 | Anderson | 165/110 |
| 3,881,548 | 5/1975 | Budenholzer | 165/DIG. 1 |
| 3,935,902 | 2/1976 | Heller et al. | 165/110 |

Primary Examiner—Sheldon J. Richter
Attorney, Agent, or Firm—Marvin B. Eickenroht; Jennings B. Thompson

[57] ABSTRACT

There are disclosed four embodiments of apparatus for use in condensing steam from the turbine exhaust of a power plant or the like, each comprising a steam condenser having means for circulating cooling medium therethrough in heat exchange relation with steam from the turbine exhaust, and wet and dry cooling towers in which the cooling medium is cooled by means of ambient air.

4 Claims, 4 Drawing Figures

STEAM CONDENSING APPARATUS

This application is a Continuation-in-Part of my co-pending application, Ser. No. 585,951, filed June 16, 1975 and entitled "Steam Condensing Apparatus", now abandoned.

This invention relates generally to apparatus for use in condensing steam from the turbine exhaust of a power plant or the like within a steam type condenser by means of cooling medium which in turn is cooled by ambient air within wet and dry cooling tower sections. More particularly, it relates to apparatus of this type in which the wet tower may be removed from service during cool weather in order to conserve make-up water in areas where water is scarce.

As used herein, a "wet" cooling tower section includes fill over which the air is caused to pass, an inlet including means for spraying a cooling medium over the fill, and an outlet including a water basin to collect the medium beneath the fill, and a "dry" cooling tower section includes a tube bundle over which the air is caused to pass, an inlet for introducing a cooling medium into the bundle, and an outlet for withdrawing the medium from the bundle. In the case of both sections, air flow may be natural draft or mechanical draft which is forced or induced by fans.

As used herein, a "steam condenser" includes one or more shells each having an inlet to receive the steam, a hot well to collect the condensate, and means intermediate the inlet and hot well for passing a cooling medium through the shell in heat exchange relation with the steam. Furthermore, the condenser may be of the direct contact or mixing type in which the medium is sprayed into the shell and then withdrawn from the hot well, or it may be of the surface type in which the medium is circulated through tubes in the shell. When two or more mediums are passed through the shell, and at least one is sprayed into the shell, the condenser is also known as a direct contact or mixing type. Still further, the cooling medium may be passed through each shell in parallel or series flow.

In apparatus of this type, the same cooling medium may be cooled in both tower sections, or a different cooling medium may be cooled in each tower section. In any event, since the cooling medium cooled in the wet tower section is usually raw water, it is normally passed through tubes in the condenser to prevent contamination of the condensate to be returned to the power cycle as well as the other cooling medium. If a second cooling medium is cooled in the dry tower section, it may be passed through additional tubes in the condenser or sprayed into the condenser and collected in the hot well thereof for circulation back to the dry tower section. In the former case, the second medium is also prevented from contaminating the condensed steam.

Owners of power plants prefer wet cooling tower sections inasmuch as they require less capital investment than dry cooling tower sections. However, owners do not have this option if the source of make-up water for the wet section is limited. Hence, as set forth in Balcke U.S. Pat. No. 3,635,042, it has been proposed to use combined wet-dry cooling tower sections, with the dry section being used at all times while the wet section is brought into use only during the warmer weather.

However, in the Balcke apparatus, the wet and dry sections are built into a single tower, which requires that the tower be of costly manufacture. Also, this arrangement of both sections in a single tower subjects tube bundles of the dry section to corrosion from the drift and water vapor from the wet section. Furthermore, if the flow of circulating water is in series, as shown in certain embodiments of the Balcke apparatus, the dry section, which is virtually maintenance free, must be taken out of service during the inspection and maintenance of the wet tower section, thereby shutting down the power plant. Still further, since both sections are built into the same tower, the design of each is controlled by the other insofar as air flow is concerned—i.e., either mechanical or natural draft—which requires costly air-flow louvre installations.

Although steam condensing apparatus of another type has been proposed in which cooling mediums are cooled in separate, conventional wet and dry cooling towers, only one such medium is circulated through a steam condenser connecting with the turbine exhaust. Thus, the other medium is instead circulated with the first medium through a heat exchanger, the necessity for which of course adds substantially to the capital cost of the overall apparatus.

The apparatus of Kilgore U.S. Pat. No. 3,831,667 also provides a means for interrupting the circulation of cooling medium between a wet tower section and the steam condenser, during cooler weather, and causing the cooling medium which is cooled in the dry section to be circulated through the steam condenser tube for the first-mentioned cooling medium, as well as through the part of the condenser through which it is normally passed. Although this makes more efficient use of the condenser when the wet section is out of service, it nevertheless requires that the cooling mediums in the two tower sections be combined. This is undesirable when, as is often the case, the cooling mediums are incompatible-e.g., when raw water is cooled in the wet section and condensate, or even an antifreeze solution or ammonia, is cooled in the dry section.

An object of this invention is to provide apparatus of this type which permits the use of conventional cooling equipment as presently found in the market place.

Another object is to provide such apparatus in which the dry tower section is not corroded by drift and water vapor from the wet tower section.

A further object is to provide such apparatus which does not require that the dry section be taken out of service during inspection and maintenance of the wet section.

Still another object is to provide such apparatus in which the type and quantity of air flow through each tower section may be best suited to that particular section.

Yet another object is to provide such apparatus which, in addition to accomplishing one or more of the foregoing objects, provides the owner with options as to the use of one or two cooling mediums and/or spray or tube type passage of cooling medium through the condenser.

Yet a further object is to provide such apparatus which is capable of accomplishing two or more of the foregoing objects.

A still further object is to provide apparatus of this type wherein, in the event the wet tower section is removed from service, cooling medium circulating through the dry tower section may be circulated through both sections of the condenser without contamination by the other cooling medium, and then, upon return of the wet section to service, circulation of both cooling mediums may be resumed through their individual condenser sections, again without contamination.

These and other objects are accomplished, in accordance with the illustrated embodiments of the invention, by apparatus of this type in which each of the wet and dry cooling tower sections comprises an individual tower separate and distinct from the other tower, thereby permitting each tower section to be of conventional, proven construction, preventing the dry tower section from being corroded by drift and vapor from the separate and distinct wet tower, and enabling the dry tower section to be maintained in service while the wet tower section is being inspected and maintained. Still further, the user of such apparatus has the option of using the same or different types of air flow—i.e., mechanical or natural draft—in the two towers, depending on economics.

The various embodiments of the invention illustrate further options which are available to users of this apparatus. For example, in the first, second and fourth embodiments, the condenser is of such construction that a different cooling medium may be cooled in each tower, while, in the third embodiment the condenser is of such construction that the same cooling medium is cooled in both towers, this arrangement reducing the piping required to circulate the medium between the towers and the condenser and thereby effecting a substantial cost reduction. The first, second and fourth embodiments, also illustrate the flexibility in the construction of the condenser in that, in the first and fourth embodiment, both cooling mediums are passed through tube sections in the condenser, while, in the second embodiment, the cooling medium which is cooled by the dry tower is sprayed into the condenser and then withdrawn from its hot well.

The first two embodiments are also of such construction that, when the wet tower is out of service, cooling medium in its condenser tube section may be drained therefrom and replaced by the cooling medium which is cooled in the dry tower in such a manner as to prevent contamination of the latter medium with the former. Then, when the wet tower is to be returned to service, the cooling medium in such tubes may be drained therefrom and replaced by the medium which is cooled in the wet tower, again in such a manner as to prevent contamination. Preferably, the first-mentioned medium is drained into the water basin of the wet tower and then returned from the water basin to the condenser tubes, thereby conserving the scarce water supply, and such medium is replaced by cooling medium from the dry tower dump tank, which is then drained from the tubes back into the dump tank, thereby avoiding loss of the cooling medium circulating through the dry tower.

In the first three embodiments, the condenser comprises a single shell, while in the fourth embodiment, the condenser comprises a pair of shells connected in parallel to the turbine exhaust and each having a hot well. More particularly, in this embodiment, a first cooling medium which is cooled in the wet tower is circulated through tubes in one shell, and a second cooling medium which is cooled in the dry tower is circulated through the tubes in the other shell. Thus, the first medium may be water and the second ammonia.

In the drawings, wherein like reference characters are used throughout to designate like parts:

Figure 1:
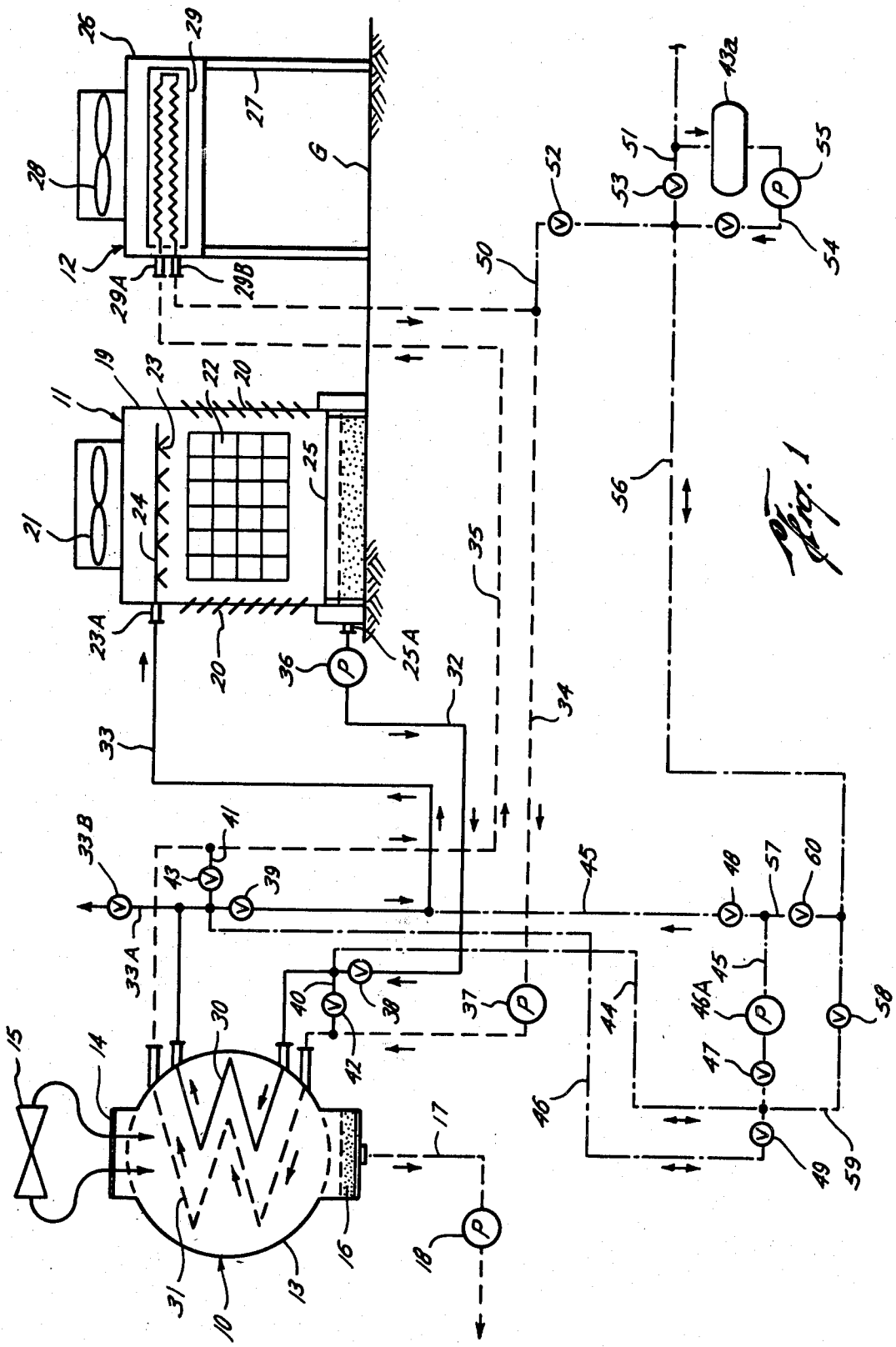
FIG. 1 is a diagrammatic view of apparatus constructed in accordance with the first embodiment of the invention.

The first embodiment of the apparatus is shown in FIG. 1 to comprise, as its principal components, a steam condenser 10, a wet cooling tower 11, and a dry cooling tower 12, together with suitable conduits connecting with these components as well as auxiliary parts of the apparatus, all in a manner to be described to follow. In the use of such apparatus in condensing steam from a turbine exhaust of a power plant or the like, the surface condenser 10 would be disposed within the power plant proper, and the cooling towers 11 and 12 supported on ground level G outside of the power plant.

Steam condenser 10 comprises a shell 13 having an inlet 14 at its upper end which is adapted to be connected to the turbine exhaust indicated diagrammatically at 15, and a hot well 16 at its lower end in which condensed steam may be collected. An outlet from the hot well is in turn connected with a conduit 17 having a pump 18 disposed therein for returning condensate in the hot well back to the boiler of the power plant. As previously described, condenser 10 may include two or more such shells.

The wet cooling tower 11 is shown to be of the mechanical draft type having a housing 19 with louvres 20 in its opposite sides and a fan 21 in its upper end. Fill or packing 22 is mounted within the housing beneath the fan 21 and opposite the louvres 20 so that ambient air is caused to pass therethrough as it is drawn through the louvres and out the upper end of the housing. A medium to be cooled is sprayed over the top of the fill by means of spray heads 23 mounted on a manifold 24 extending inwardly from an inlet 23A into the housing. The cooling medium which flows downwardly through the fill 22 is collected in a water basin 25 in the lower end of the housing which is connected to an outlet 25A from the housing.

The dry cooling tower 12 is also of the mechanical draft type and comprises a housing 26 which is mounted on legs 27 above the ground level G so as to permit ambient air to be drawn upwardly through its open lower end by means of a fan 28 on the upper end of the housing. As indicated diagrammatically in FIG. 1, a tube bundle 29 is mounted laterally in the housing in the path of the air flow therethrough, with an upper bank of the tubes of the bundle being connected to an inlet 29A to the housing and the lower bank of tubes connected to an outlet 29B from the housing.

As illustrated diagrammatically in FIG. 1, two sets or sections of tubes 30 and 31 are mounted within the shell 13 of condenser 10 so as to be in the path of steam flowing from the inlet 14 into the hot well 16. As previously described, each set of tubes is adapted to pass a cooling medium through the shell of the condenser in heat exchange relation with the steam from the turbine exhaust. More particularly, cooling medium from the wet tower 11 is passed through the tubes 30, while cooling medium from the dry tower 12 is passed through the tubes 31, the ends of the tubes connecting with water boxes on the side of the shell, as shown diagrammatically in FIG. 1. If, as previously discussed, the condenser is made up of more than one shell, there would be a corresponding number of sets of tubes.

A cooling medium is circulated from the wet tower 11 into the lower end of tube section 30 through a first conduit 32, and returned from the upper end of tube section 30 into the inlet of wet tower 11 through a second conduit 33. On the other hand, cooling medium is circulated from the outlet of the dry tower 12 into the lower end of tube section 31 through a third conduit 34, and returned from the upper end of tube section 31 to the inlet of the dry tower through a fourth conduit 35. A pump 36 is disposed in conduit 32 for circulating the first cooling medium, and a pump 37 is disposed in conduit 34 for circulating the second cooling medium.

As previously described, this embodiment of the invention permits the cooling mediums to be different, with the cooling medium cooled in the wet tower normally being raw water, and the cooling medium in the dry tower normally being condensate, or, in some cases, an antifreeze solution. The above prescribed means for circulating the cooling mediums maintains them separate from one another, so that, with both towers in service, the medium circulating through the dry tower is not contaminated by the raw water circulating through the wet tower. Furthermore, the circulation of the two cooling mediums through tube sections 30 and 31 within the condenser shell prevents either from contaminating the steam within the condenser.

As previously described, this invention contemplates that while the dry tower 12 will be in service at all times, the wet tower may be removed from service during winter months thereby enabling a substantial saving in make-up water. The wet tower may be removed from service by the closing of valves 38 and 39 in the conduits 32 and 33, respectively. Also, of course, when the wet tower is removed from service, the pump 36 is shut down. Although no means is provided for removing the dry tower from service, this invention contemplates that, as in conventional dry tower construction, it may include means for adjusting its capacity, such as fan blade adjustments, adjustable louvres, and sectionalized tube bundle arrangements.

As previously described, when the wet tower is removed from service, the tube section 30 is preferably connected to the dry tower circuit so that the cooling medium circulating through the dry tower can be passed through both tube sections 30 and 31 of the condenser. For this purpose, a fifth conduit 40 connects conduit 34 with conduit 32 intermediate valve 38 and the inlet to tube section 30, and a sixth conduit 41 connects conduit 35 with conduit 33 intermediate valve 39 and the outlet from tube section 30. More particularly, a valve 42 is mounted in conduit 40, and a valve 43 is mounted in conduit 41, whereby with valves 38 and 39 closed, each of valves 42 and 43 may be opened to permit cooling medium circulating through conduits 34 and 35 to pass through both tube sections 30 and 31.

The means for dumping raw water from tube section 30 and adjacent portions of the conduits 32 and 33 into water basin 25, and replacing such raw water with the other cooling medium, which is stored in a tank 43a, comprises a plurality of auxiliary conduits connecting with the circulating conduits as well as with the tank 43a. Thus, a seventh conduit connects conduit 32 intermediate valve 38 and the inlet to tube section 30 with an eighth conduit 45, which in turn connects with conduit 33 intermediate valve 39 in the inlet to the wet tower 11. A ninth conduit 46 connects conduit 33 intermediate valve 39 and the outlet from tube section 30 with eighth conduit 45 in parallel relation with the seventh conduit 44. A pump 46a is disposed intermediate valves 47 and 48 in conduit 45, and a valve 49 is disposed in conduit 46 intermediate the connections therewith of conduits 44 and 32. Also, a vent 33A connecting with conduit 33 has a valve 33B disposed therein, which is adapted to be opened during draining and filling of tube section 30.

Assuming that the other valves in adjacent auxiliary conduits (to be described) are closed, and the valves 47, 48, 49 and 33B are open, pump 46a may be started so as to withdraw raw water from the tube section 30 and adjacent portions of the conduits 32 and 33 connecting with it through conduits 44, 46 and 45 into the conduit 33. Thus, with the valves 38 and 39 closed for the purpose of removing the wet tower from service, this raw water passes through conduit 33 and is sprayed through heads 23 into the housing of wet tower 11, and thus collected with other raw water in the water basin 25.

Tube section 30 and adjacent portions of conduits 32 and 33 may then be filled with cooling medium which has been dumped into tank 43a. The dry cooling tower bundles 29 are both drained and filled with cooling medium from tank 43a as required in the normal process of operating the power plant; and, for this purpose, bundles 29 are connected to circulating conduit 34, which in turn is connected to drain and fill conduits 50 and 51 leading to the top side of the tank. Valves 52 and 53 in the conduits 50 and 51, respectively, provide a means for controlling the bundle drain and fill rate of cooling medium into and out of tank 43a. An additional conduit 54 connects the bottom of the tank with conduits 51 and 56, and has a pump 55 installed therein so as to permit cooling medium to be pumped back into the circulating line 34 and thus into the dry cooling tower bundles 29, as well as a valve 60a for controlling the flow of cooling medium back into the system. Conduits 50, 51 and 54, valves 52, 53 and 60a, and pump 55 as well as tank 43a are, of course, standard items of equipment in a dry tower system.

The means for filling tube section 30 and associated portions of the conduits 32 and 33 includes a conduit 56 having a branch 59 connecting the tank with conduits 44 and 46 and having a valve 58 disposed therein. Conduit 56 has another branch 57 which connects with conduit 45 intermediate valve 48 and pump 46a, and which has a valve 60 disposed therein. With valves 52, 53, 47, 48 and 60 closed, pump 55 may be started in order to fill tube section 30 and associated portions of conduits 32 and 33 with cooling medium from tank 43a via conduits 54, 56 and 59. When the filling operation is completed, pump 55 is stopped, valves 58 and 60 are closed, and valves 42 and 43 are slowly opened to connect the dry tower system with tube section 30.

When it is desired to return the wet tower 11 to service, the cooling medium is first drained from the tube section 30 and associated parts of conduits 32 and 33 into tank 43a. For this purpose, valves 42, 43, 48 and 58 are closed, valves 47, 33B, 60 and 53 are opened, and pump 46a is started in order to return cooling medium to tank 43a. When tube section 30 and its associated conduits are thus drained, valve 47 is closed, valve 39 opened wide, valve 38 opened partially, and pump 36 started. Valve 38 is then slowly opened wide so that raw water from water basin 25 is again pumped into tube section 30 and the portions of conduits 32 and 33 adjacent thereto.

Figure 2:
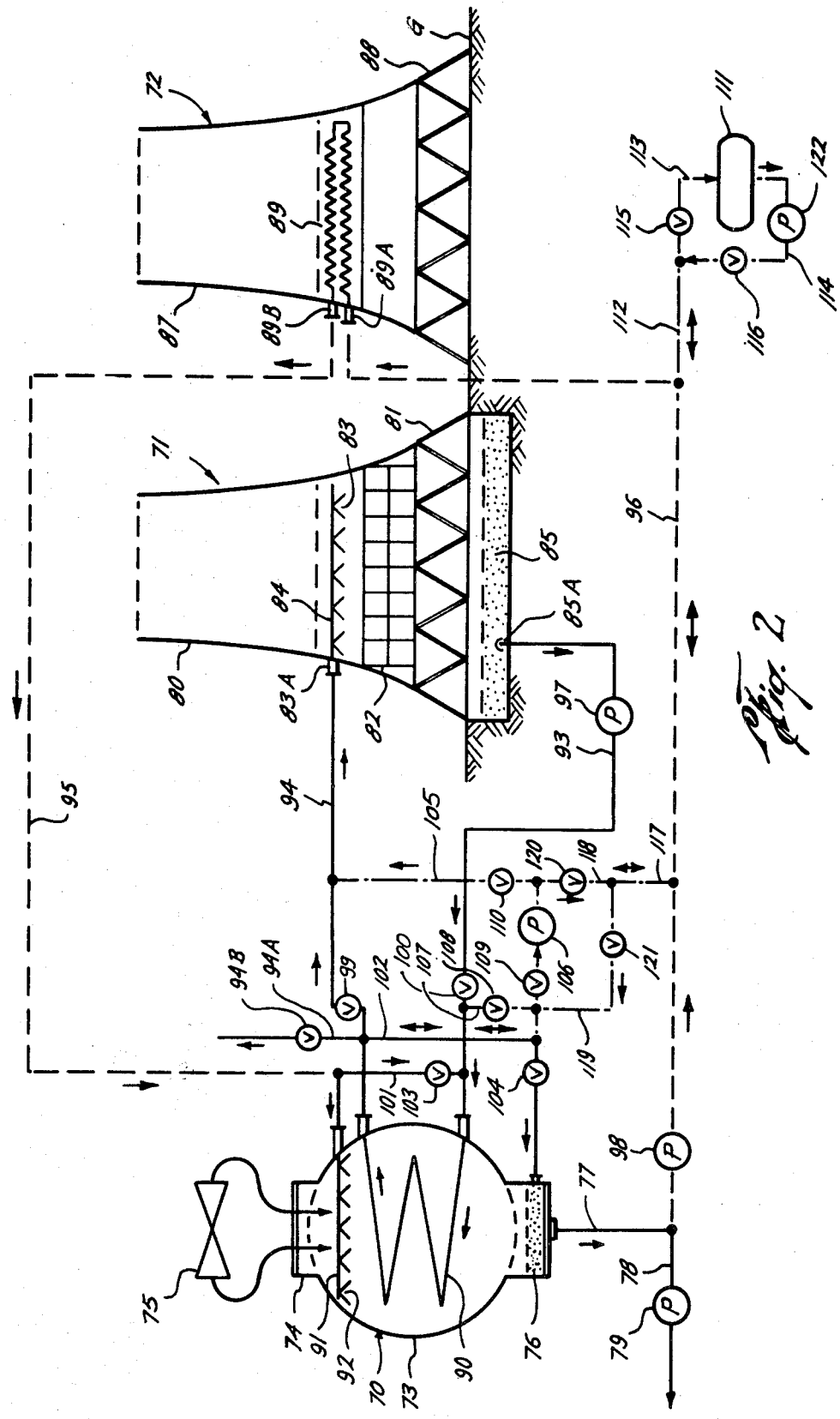
FIG. 2 is a diagrammatic illustration of apparatus constructed in accordance with the second embodiment of the invention.

The second embodiment of the apparatus shown in FIG. 2 is similar to the embodiment of FIG. 1 in that it comprises, as its principal components, a steam condenser 70, a wet cooling tower 71, and a dry cooling tower 72, together with conduits connecting with these components as well as auxiliary parts of the apparatus, as will be described to follow. As in the case of the condenser 10, steam condenser 70 would be disposed within the power plant proper, and the cooling towers 71 and 72 supported on ground level G outside of the plant.

Steam condenser 70 comprises a shell 73 having an inlet 74 at its upper end adapted to be connected to the turbine exhaust indicated diagrammatically at 75, and a hot well 76 at its lower end for collecting condensed steam. Condensed steam then flows through the hot well into an outlet leading to conduit 77 connecting with conduit 78 and having a pump 79 disposed therein for returning the condensate to the boiler at the power plant.

The wet cooling tower 71 is shown to be of the natural draft type having a stack or chimney 80 which is open about its lower end 81 to permit ambient air to flow upwardly therethrough and out the upper end of the chimney. Fill or packing 82 is mounted across the chimney above its open lower end 81 so that the upwardly flowing air passes therethrough. A medium to be cooled in the wet tower 71 is introduced thereto through an inlet 83A connecting with manifold 84 having spray heads 83 mounted thereon above the fill. As well known in the art, the cooling medium flows downwardly through fill 82, and is collected in a water basin 85 beneath the inlet to the tower and connecting with an outlet 85A from the basin.

The dry cooling tower 72 is also of the natural draft type, and comprises a stack or chimney 87 which has an open lower end 88 similar to tower 80 so as to permit ambient air to be drawn upwardly therethrough and out the upper end of the chimney. As shown in FIG. 2, one or more tube bundles 89 are mounted across the chimney above the open lower end 88 therethrough so that air is caused to pass through the bundle. More particularly, a lower bank of the bundle is connected with an inlet 89A, and an upper bank of the bundle is connected with an outlet 89B.

As illustrated diagrammatically in FIG. 2, a section 90 of tubes is mounted within the shell so as to be in the path of steam flowing from the inlet to the outlet thereof. In accordance with this second embodiment of the invention, the tube section 90 is adapted to be connected with a first medium which is cooled within the wet tower 11, and a second cooling medium which is cooled in the dry tower 72 is caused to pass into the shell through an inlet leading to a manifold 91 having spray heads 92 mounted thereon above tube section 90. The second cooling medium thus cools the steam from the turbine exhaust by direct contact therewith and is collected with other condensate in the hot well 76. A first conduit 93 connects outlet 85A with the lower end of the tube section 90, and a second conduit 94 connects the upper end of tube section 90 with the inlet 83A. On the other hand, cooling medium is circulated from the outlet 89B of the dry tower into manifold 91 through a third conduit 95, and is returned from the hot well 76 of condenser 70 to the inlet to the tube bundle of the dry tower through conduit 77 and a fourth conduit 96 connecting conduit 77 with the inlet.

A pump 97 is disposed in first conduit 93 for circulating cooling medium from the wet tower into the steam condenser and returning it to the wet tower for circulation therethrough, and a pump 98 is disposed in conduit 96 for circulating a cooling medium from the steam condenser through the dry tower and then back into and through the steam condenser. As in the case of the first embodiment, this second embodiment of the invention maintains the cooling mediums circulated through the towers separate from one another. As was also the case of the first embodiment, cooling medium in the wet cycle may be raw water. However, since the cooling medium circulated through the dry tower is combined with steam condensate in hot well 76, it is of course also condensate. From an economic standpoint, use of such a direct contact or mixing type of condenser is preferred. However, from an operating standpoint, the surface type condenser 10 would be preferred since it prevents contamination of the steam condensate with condensate circulated through the tube bundles of the dry tower, and further permits the use of other cooling mediums, such as an antifreeze solution.

As in the case of the first embodiment, the second embodiment of the invention contemplates that while the dry tower is maintained in service at all times, the wet tower may be removed from service during winter months. For this purpose, a valve 99 is disposed in conduit 94, and a valve 100 is disposed in conduit 93, the closing of these valves interrupting circulation between the wet tower and the condenser. At this time, of course, the pump 97 for the wet tower circuit would also be shut down.

As in the case of the first embodiment, when the wet tower is removed from service, tube section 90 and the parts of conduits 93 and 94 adjacent thereto are preferably connected to the dry tower circuit so that full use may be made of the condenser 70. Thus, for this purpose, a fifth conduit 101 connects conduit 95 with conduit 93 intermediate valve 100 and tube section 90, and a sixth conduit 102 connects conduit 94 intermediate valve 99 and the tube section 90 with hot well 76. More particularly, there is a valve 103 in conduit 101 and a valve 104 in conduit 102, opening of these valves permitting cooling medium from the dry tower to be circulated through the tube section 90.

As was also true in the first embodiment of the invention, cooling medium from the wet tower cycle may be drained from the tube section 90 and adjacent portions of conduits 93 and 94 into the water basin 85 of the wet tower 71. For this purpose, a conduit 105 connects with conduit 102 intermediate valve 104 and the connection of conduit 102 with conduit 94, and a conduit 107 connects conduit 105 to conduit 93 intermediate valve 100 and the inlet to tube section 90. As also shown in FIG. 2, a pump 106 is disposed in conduit 105 intermediate valves 109 and 110, valve 109 being intermediate pump 106 and the connection of conduit 105 with conduit 102. As in the case of the first embodiment, a vent conduit 94A connecting with conduit 94 intermediate valve 99 and tube section 90 has a valve 94B therein which may be opened during draining and filling of the tube section.

When valves 99 and 100 are closed to remove the wet tower from service, valves 94B, 108, 109 and 110 may be opened (the other valves in adjacent auxiliary conduits to be described being closed), and pump 106 may be started to withdraw raw water from tube section 90 and adjacent parts of conduits 93 and 94 and direct it through conduit 105 and 94 into the inlet to the wet tower, from which it is sprayed onto the fill and into the water basin 85.

With the raw water drained, condensate may then be supplied from a dump tank 111 in which cooling medium normally circulated through the dry tower is stored. Thus, as shown, a conduit 112 leads from conduit 96 for connection with the conduit 113 connecting with the top side of tank 111 and with conduit 114 connecting with the bottom side of the tank. A valve 115 is disposed in conduit 113, and a valve 116 is disposed in conduit 114. As in the case of the first embodiment, the tank and pump are standard parts of a dry tower system. A conduit 117 connecting with conduit 96 leads to conduit 119 connecting with conduits 105 and 107 and having a valve 121 disposed therein. Thus, valves 116, 121, 108 and 94B may be opened (adjacent valves including valves 103, 104 and 109 being closed), and pump 122 started in order to fill tube section 90 with condensate from tank 111.

The means for draining condensate from tube section 90 and associated parts of conduits 93 and 94 includes a conduit 118 connecting conduit 117 with conduit 105 intermediate pump 106 and valve 110. With valves 103, 104 and 116 closed, and valves 94b, 108, 109, 120 and 115 open, pump 106 may be started to return the condensate to tank 111. Then, in order to fill tube section 90 with raw water from basin 85, pump 106 is stopped, valves 108, 109, 120 and 115 are closed, valve 99 is opened wide, and valve 100 is opened partially. Circulating pump 97 is then started, and valve 100 is slowly opened wide so as to permit raw water from the water basin 85 to fill tube 90 and associated parts of conduits 93 and 94. At this time, valve 94b may be closed.

Figure 3:
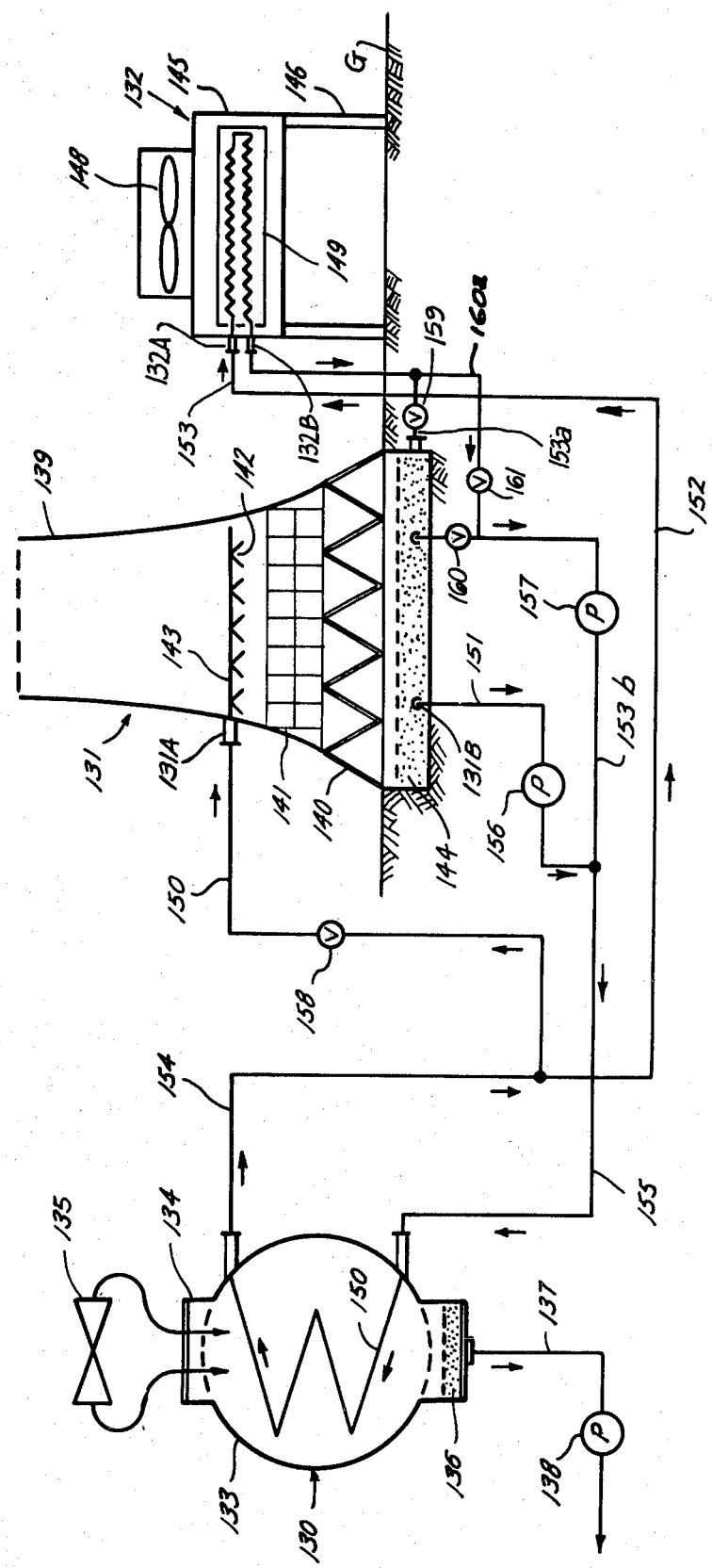
FIG. 3 is a diagrammatic illustration of apparatus constructed in accordance with the third embodiment of the invention.

The third embodiment of the invention shown in FIG. 3 is similar to the first two embodiments in that it comprises, as its principal components, a steam condenser 130, a wet cooling tower 131, and a dry cooling tower 132, together with suitable conduits connecting with these components as well as with auxiliary parts of the apparatus to be described. Furthermore, as in the case of the first two embodiments, the steam condenser would be disposed within the power plant proper, and the cooling towers 131 and 132 supported on ground level G outside of the power plant proper.

As was also true of the first two embodiments, steam condenser 130 comprises a shell 133 having an inlet 134 at its upper end connected to the turbine exhaust indicated diagrammatically at 135, and a hot well 136 at its lower end in which condensed steam is collected. Condensate is removed from the hot well and returned to the power cycle through an outlet connecting with conduit 137 having a pump 138 disposed therein.

Similarly to the cooling tower of the second embodiment, wet cooling tower 131 is of the natural draft type, having a stack or chimney 139 which is open at its upper end and open at its lower end 140, so that ambient air is drawn upwardly therethrough. Fill or packing 141 is mounted within the housing above the open lower end 140 so that the air passes therethrough, and a medium to be cooled in the wet tower is sprayed onto the fill be means of spray heads 142 mounted on a manifold 143 connecting with inlet 131A to the wet tower. The cooling medium which flows downwardly through the fill 141 is collected in a water basin 144 in the lower end of the housing which connects to outlet 131B from the basin.

Similarly to the dry tower 12 of the first embodiment, dry tower 132 of this third embodiment is of the mechanical draft type comprising a housing 145 mounted on legs 146 so as to permit air to be drawn upwardly through its open lower end by means of a fan 148 on the upper end of the housing. A tube bundle 149 is mounted laterally in the housing above its open lower end so that the air passes therethrough. An upper bank of the bundle is connected to the inlet 132A to the tower, and the lower bank thereof is connected to an outlet 132A therefrom.

As previously described, steam condenser 130 differs from the steam condensers of the first two embodiments of the invention in that the cooling medium circulated through both towers is passed through a single section 150 of tubes mounted within the shell 133 of the condenser in heat exchange relation with steam flowing from the inlet 134 into the hot well 136.

A first conduit 150 connects with the inlet 131A to the wet tower, and a second conduit 151 connects with the outlet 131B therefrom. In like manner, a third conduit 152 connects with the inlet 132A to the tube bundle of the dry tower, and a fourth conduit 153 connects with the outlet 132B therefrom. The opposite ends of conduits 150 and 152 are connected with a fifth conduit 154 leading from the outlet end of the tube section 150, and the opposite ends of conduits 151 and 153 are connected with a sixth conduit 155 connecting with the inlet end of tube section 150.

A pump 156 is mounted in conduit 151 for circulating the cooling medium from the outlet of the wet tower through tube section 150 and back into and through the wet tower. On the other hand, a pump 157 is mounted in conduit 153 for circulating the cooling medium from the outlet of the dry tower through tube section 150 and back into the dry tower.

As shown in FIG. 3, conduit 153 is preferably made up of sections 153a and 153b, the section 153a connecting the outlet from the dry tower with the water basin 144, the section 153b connecting the water basin with conduit 155, and pump 157 being disposed in section 153b. This simplifies the pumping problem for pump 157 in that both pumps 156 and 157 have the same suction and discharge pumping heads.

As also shown in FIG. 3, a by-pass conduit 160a connects conduit section 153a with conduit section 153b beneath the water basin. Also, a valve 161 is disposed in conduit 160a, a valve 160 is disposed in conduit section 153b above the connection therewith of section 153a, and a valve 159 is disposed in conduit section 153a. Thus, during winter, some power of pump 157 may be saved by closing valves 159 and 160 and opening valve 161.

As previously mentioned, the embodiment of FIG. 3 has cost advantages in that it involves only two circulating conduits connecting with the steam condenser. It also has less condenser water boxes, so that the condenser would be less costly. On the other hand, it is less preferred in that it utilizes dirty raw water in the dry tower, which would require a tube-cleaning system similar to that presently employed for surface condensers.

As in the case of the first two embodiments, the wet tower may be removed from service during winter months. Thus, it is merely necessary to close a valve 158 in conduit 150 and to stop circulating pump 156. Obviously, since there is only one medium circulating through the wet and dry systems, it is not necessary to drain and refill tube section 150 within steam condenser 130.

Figure 4:
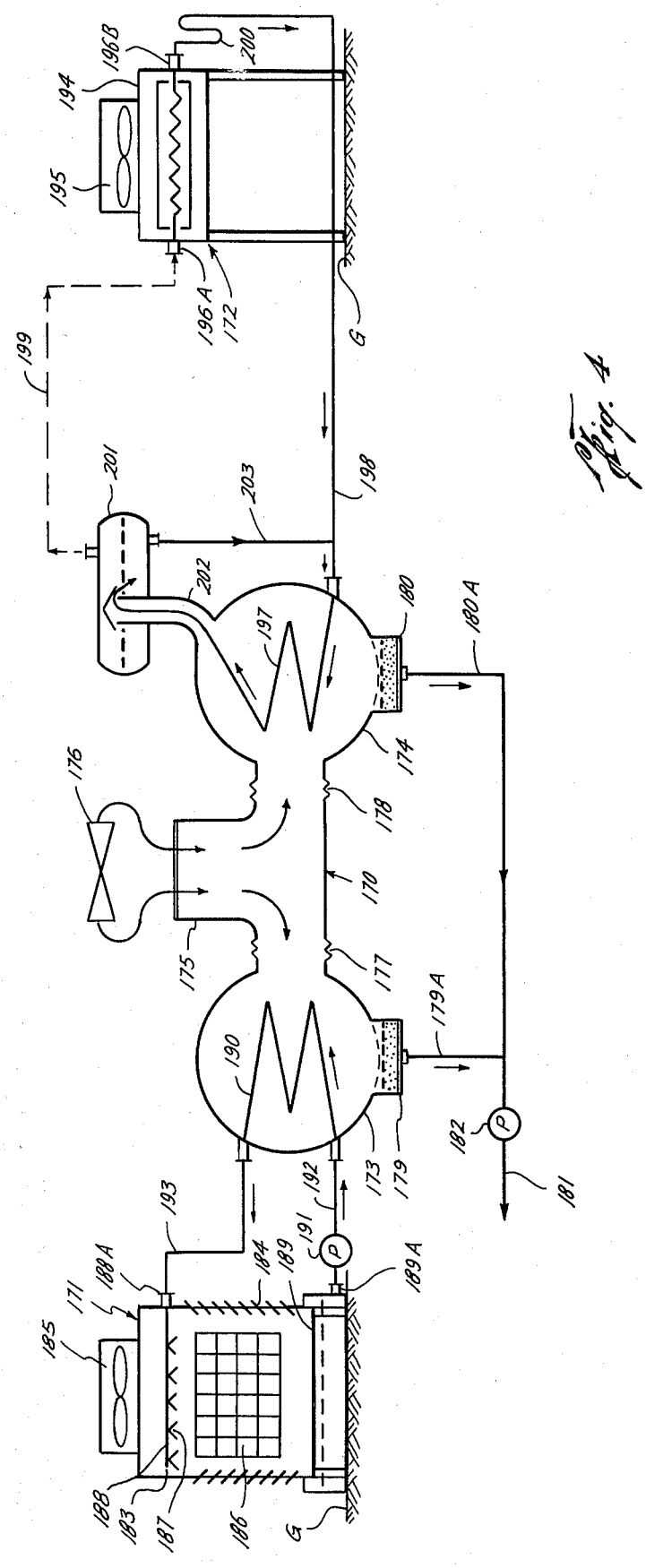
FIG. 4 is a diagrammatic illustration of apparatus constructed in accordance with the fourth embodiment of the invention.

The fourth embodiment of the invention shown in FIG. 4 is similar to the first three embodiments of FIGS. 1, 2 and 3 in that it also comprises, as its principal components, a steam condenser 170, a wet cooling tower 171, and a dry cooling tower 172, together with suitable conduits connecting with these components as well as with auxiliary parts of the overall apparatus to be described. As was also the case in the previously described embodiments, it is contemplated that the steam condenser would be disposed within the power plant proper, and that the cooling towers 171 and 172 would be supported on ground level G outside of the plant.

As compared with the first three embodiments, however, surface type steam condenser 170 comprises a pair of shells 173 and 174 each connecting with a steam duct or manifold 175 adapted to receive steam from the turbine exhaust 176 of the power plant. Thus, as shown in the drawing, steam enters shell 173 through a first branch 177 of the duct and shell 174 through a second branch 178 thereof. A first cooling medium is circulated through tubes 190 mounted within shell 173, and a second cooling medium is circulated through tubes 197 mounted within shell 174. The steam is thus condensed by the cooling medium circulated through each shell, and the condensate is collected within hot wells 179 and 180, in the lower ends of shells 173 and 174, respectively. Conduits 179A and 180A leading from the outlets from hot wells 179 and 180, respectively, connect with a conduit 181 having a pump 182 disposed therein for returning the condensate to the power cycle.

Similarly to the cooling tower of the first and third embodiments of the invention, wet cooling tower 171 is of the mechanical draft type having a housing 183 with louvres 184 in its opposite sides and a fan 185 in its open upper end. Fill or packing 186 is mounted within the housing beneath the fan and opposite the louvres so that ambient air is caused to pass therethrough as it is drawn through the louvres and out the open upper end of the housing. A medium to be cooled, which may be water, is sprayed over the top of the fill by means of spray heads 187 mounted on manifold 188 extending inwardly from an inlet 188A into the housing. The cooling medium which flows downwardly through the fill is collected in a water basin 189 in the lower end of the housing, which in turn is connected to an outlet 189A from the housing.

The first cooling medium circulating through tubes 190 mounted within shell 173 of condenser 170 is cooled within the wet cooling tower 173. Thus, as shown in FIG. 4, a conduit 192 connects outlet 189A from water basin 189 of the wet tower with a condenser water box connecting with the lower end of tubes 190, and a conduit 193 connects a condenser water box connecting with the upper end of tubes 190 with inlet 188A to the spray head manifold 188 of the wet tower. The cooling medium is circulated through the tower and tubes 190 by means of pump 191 disposed in conduit 192.

The second cooling medium circulating through tubes 197 is cooled within dry cooling tower 172, which, similarly to the dry cooling towers of the first and third embodiments, is of the mechanical draft type. Thus, it comprises a housing 194 mounted on legs above ground level G so as to permit ambient air to be drawn upwardly through its open lower end by means of a fan 195 at its open upper end. As indicated diagrammatically in FIG. 4, a tube bundle 196 is mounted laterally across the housing in the path of the air flow therethrough, the left end of the bundle being connected to an inlet 196A and the outlet from the bundle being connected to an outlet 196B. The second cooling medium which is circulated from outlet 196B to the water box connecting with the lower end of tubes 197 by means of a conduit 198, and is circulated from the opposite ends of the tubes 197 back to the tube bundle by means of a conduit 199 connecting with the inlet 196A.

In this embodiment, however, the second cooling medium circulating through tubes 197, and thus condensing steam in shell 174, is not water, but is instead ammonia, which, as well known in the art, provides an excellent cooling medium due to its low freezing point and its improved high heat transfer capability as compared with water. As also well known in the art, natural circulation is inherent in a typical cooling cycle wherein ammonia is vaporized in the process of condensing steam so that there is no need for circulating pumps.

In this ammonia cooling cycle, the ammonia vapor is condensed within the dry cooling tower 172 thus introduced in liquid form into the lower end of tubes 197, a loop seal 200 being preferably disposed within conduit 198 for preventing the back flow of any gas within the line. This liquid ammonia is partially vaporized by the steam within condenser shell 174, and the condensate and vapors are circulated through the upper end of tubes 197 into a separator tank 201 connected above shell 174 by means of piping 202. Liquid ammonia from the tank is recirculated through the tubes 197 by means of a conduit 203 leading from the bottom of tank 201 to conduit 198. Conduit 199, on the other hand, connects with the upper end of tank 201 so as to receive ammonia vapors for circulation into and condensation within bundle 196 of the dry tower.

As in the previous embodiments, the wet tower 171 may be removed from service during the winter months. For this purpose, it is merely necessary to shut down pump 191 so as to discontinue circulation of the first cooling medium through tubes 190, and shut off fans 185.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for use in condensing steam from the turbine exhaust of a power plant or the like, comprising a steam condenser having inlet means for receiving steam from the turbine exhaust, hot well means to receive condensed steam, and outlet means for returning condensate from the hot well to the power cycle, cooling tower means having a wet section and a dry section, the wet tower section having an inlet to receive a first cooling medium, an outlet for discharging the first medium, and means for cooling the first medium with ambient air as it passes from the inlet to the outlet, the dry tower section having an inlet to receive a second cooling medium, an outlet for discharging the second medium, and means for cooling the second medium with ambient air as it passes from the inlet to the outlet, means for circulating the first medium from the outlet from the wet cooling tower section into and through tubes within the condenser and then returning it to the inlet to said wet cooling tower section, means for circulating the second medium from the outlet from the dry cooling tower section into and through the condenser and then returning it to the inlet to said dry cooling tower section, means for interrupting the circulation of said first medium between said wet tower section and said condenser tubes, means for emptying said first medium from the tubes and then filling said tubes with the second medium, when such circulation is interrupted, and means for emptying the second medium from the tubes and then refilling the tubes with the first medium, whereby circulation of said first medium between said wet tower section and said condenser tubes may be resumed.

2. Apparatus of the character defined in claim 1, wherein said cooling tower means includes separate wet and dry cooling towers.

3. Apparatus for use in condensing steam from the turbine exhaust of a power plant or the like, comprising a steam condenser having inlet means for receiving steam from the turbine exhaust, hot well means to receive condensed steam, and outlet means for returning condensate from the hot well to the power cycle, cooling tower means having a wet section and a dry section, the wet tower section including fill over which ambient air is caused to pass, an inlet having means for spraying a first cooling medium over the fill, and an outlet having a water basin to collect the first medium beneath the fill, the dry tower section including a tube bundle over which ambient air is caused to pass, an inlet for introducing a second cooling medium into the bundle, and an outlet for withdrawing the second medium from the bundle after it has flowed therethrough, a tank into which the second cooling medium may be dumped, means for circulating the first medium from the outlet from the wet cooling tower section into and through tubes within the condenser and then returning it to said wet cooling tower section, means for circulating the second medium from the outlet from the dry cooling tower section into and through the condenser and then returning it to the inlet to said dry cooling tower section, means for interrupting the circulation of said first medium between said wet tower section and said condenser tubes, means for emptying said first medium from the tubes into the water basin and then filling said tubes with the second medium from the tank, when such circulation is interrupted, and means for returning the second medium from the tubes back to the tank and then refilling the tubes with the first medium from the water basin, whereby circulation of said first medium between said wet tower section and said condenser tubes may be resumed.

4. Apparatus of the character defined in claim 3, wherein said emptying and returning means includes part of said circulating means.

* * * * *